United States Patent [19]

Courts et al.

[11] Patent Number: 5,386,536
[45] Date of Patent: Jan. 31, 1995

[54] APPARATUS AND METHOD FOR MANAGING MEMORY ALLOCATION

[76] Inventors: Howard R. Courts, 8606 Silver Ridge; Don C. Capps, 7918 Cahill, both of Austin, Tex. 78759

[21] Appl. No.: 676,616

[22] Filed: Mar. 28, 1991

[51] Int. Cl.⁶ .............................................. G06F 12/12
[52] U.S. Cl. ..................... 395/425; 364/DIG. 1; 364/246.12; 364/228.1; 364/228.2; 395/400
[58] Field of Search ... 364/200 MS File, 900 MS File; 395/400, 425

[56] References Cited

U.S. PATENT DOCUMENTS

| | | | |
|---|---|---|---|
| 4,463,424 | 7/1984 | Mattson et al. | 395/425 |
| 4,758,944 | 7/1988 | Bartley et al. | 395/425 |
| 4,805,097 | 2/1989 | De Sanna | 395/400 |
| 5,093,913 | 3/1992 | Bishop et al. | 395/650 |
| 5,155,809 | 10/1992 | Baker et al. | 395/200 |

*Primary Examiner*—Joseph L. Dixon
*Assistant Examiner*—Hiep Nguyen
*Attorney, Agent, or Firm*—Robert L. Troike; Richard L. Donaldson

[57] ABSTRACT

A system for dynamically allocating memory to a file buffer cache manager and a virtual memory space manager is provided. The file buffer cache memory is time stamped at times of acquisition and access, and the acquired virtual memory space memory is time stamped at times of acquisition and access. If the file buffer cache manager or the virtual memory address manager requests memory, the time stamps of the memories acquired by the file buffer cache manager and the virtual memory space manager are compared. The piece of memory which has the earlier time stamp is preempted and allocated to the manager which has requested memory.

72 Claims, 2 Drawing Sheets

APPARATUS AND METHOD FOR MANAGING MEMORY ALLOCATION

TECHNICAL FIELD OF THE INVENTION

This invention relates in general to the field of computer systems. More particularly, the present invention relates to dynamic memory allocation for a file buffer cache.

BACKGROUND OF THE INVENTION

In a computer system which utilizes a file system buffer cache (FBC) scheme, it is often difficult to determine how much main memory to allocate between the buffer cache and the virtual address space used by user applications. The allocation is typically performed at system boot time, at which instance a specified amount of memory is allocated to the FBC and the remaining memory is allocated as virtual address space. The amount of memory required by the FBC and user processes is therefore very load dependent and application specific, which can vary greatly. Such demand variations can even fluctuate by the hour. Therefore, static memory allocation have at least two problems. First, it is difficult to arrive at a good estimate of the demand for memory for the initial allocation. Second, once the memory space is allocated, the allocation may result in memory not being used efficiently because of over-allocation, or improper operation because of under-allocation.

In recognition of this problem, one solution has been formulated. This solution allows the mapping of FBC onto the virtual address space, so that in effect both the FBC and the user processes satisfy memory requirements by acquiring memory space from the same pool. Although effectively resolving the problems associated with static memory allocation, the implementation of such a scheme involves a substantial reprogramming of the FBC and virtual memory (VM) management software modules. In addition, it is possible for either FBC or user processes to dominate by acquiring a major portion of available memory space. In constant contention for available memory space, either FBC or user processes may lose when there is a heavy demand by the other.

Therefore, it is desirable to provide for a memory allocation scheme which allows FBC and user processes to request memory and allocate it accordingly in a dynamic fashion. Furthermore, it is desirable to achieve dynamic memory allocation without major revision and modification of current FBC and VM management software.

In addition, in a multiprocessor system, though the management of FBC and VM does not cross processor boundaries, access to memory may. This multiprocessor environment poses special challenges in implementing a dynamic memory allocation system. Thus, it is desirable to achieve dynamic memory allocation that functions in a multiprocessor environment.

SUMMARY OF THE INVENTION

In accordance with the present invention, a dynamic file buffer cache is provided which substantially eliminates or reduces disadvantages and problems associated with prior buffer cache systems.

In one aspect of the present invention, a system for dynamically allocating memory to a file buffer cache and a virtual memory space is provided. The system comprises means for time stamping the acquired file buffer cache memory at times of acquisition and access, and means for time stamping each of the acquired virtual memory space memory at times of acquisition and access. If one manager requests memory, the time stamps of the memories acquired by the file buffer cache management means and the virtual memory space management means are compared. The piece of memory which has the earlier time stamp is preempted and allocated to the manager which has requested memory.

In another aspect of the present invention, a method for dynamically allocating a predetermined amount of memory between a first and a second competing resource is described. The steps comprise allocating memory for the first resource, and time stamping the memory allocated to the first resource. The memory allocated to the second resource is also time stamped. Thereafter, in the event of a memory request by the first or second resource, the time stamps of the least recently used memories allocated thereto are compared. The memory having the older time stamp is preempted.

An important technical advantage of the present invention provides a simple yet elegant way of altering a static file buffer cache to a dynamic one that responds to system load conditions.

Another important technical advantage of the present invention provides a solution to the under- or over-allocation problem involved in file buffer cache systems.

BRIEF DESCRIPTION OF THE DRAWINGS

For a better understanding of the present invention, reference may be made to the accompanying drawings, in which.

DETAILED DESCRIPTION OF THE INVENTION

Figure 1:
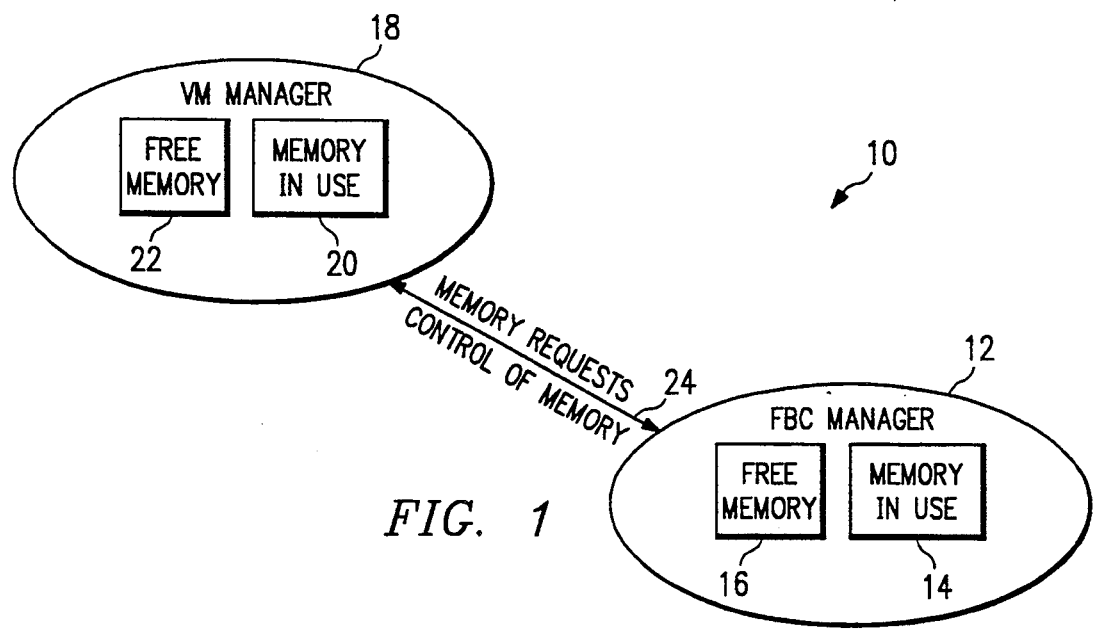
FIG. 1 is a top level diagram of the preferred embodiment of the present invention.

With reference to the drawings, FIG. 1 illustrates a preferred embodiment of the dynamic file buffer cache, indicated generally at 10 and constructed according to the teaching of the present invention. In a computer (not shown) utilizing a file buffer cache, its operations are typically managed by a file buffer cache (FBC) manager 12. FBC manager 12 oversees what portions of the disk file system are being cached, flushing cache buffers to accommodate more recently used file system data, etc. Therefore, FBC manager 12 has under its control some memory which is being used to cache the file system data 14, and some memory which is free 16. Free memory may be unused memory or memory which holds very outdated data. A virtual memory (VM) manager 18 generally manages the allocation and use of the virtual address space of the computer. VM manager 18 may also have some memory which is in use 20, and some which is not 22.

In a computer which allocates memory to the file buffer cache statically, a fixed amount of memory is assigned to the buffer cache at system boot time. The remaining memory which was not allotted to the buffer cache then becomes the VM manager's domain. Therefore, in such a static allocation system, the size of memory under the control of FBC manager 12 or VM manager 18 does not vary and is not adaptable to system load conditions. Therefore, either memory is wasted because of over-allocation, or in the case of FBC manager 12, buffers are preempted prematurely to accommodate more recently used file data.

On the other hand, FBC manager 12 and VM manager 18 in the present invention do not preempt memory under its own control until it first issues a request to the other manager. A comparison is made to determine which manager 12 or 18 has in its possession free memory or memory with less recently used data. The control of that piece of memory is then passed to the other manager if the comparison indicates that the other manager's memory should be preempted. The communication between VM manager 18 and FBC manager 12 is shown as path 24.

Figure 2:
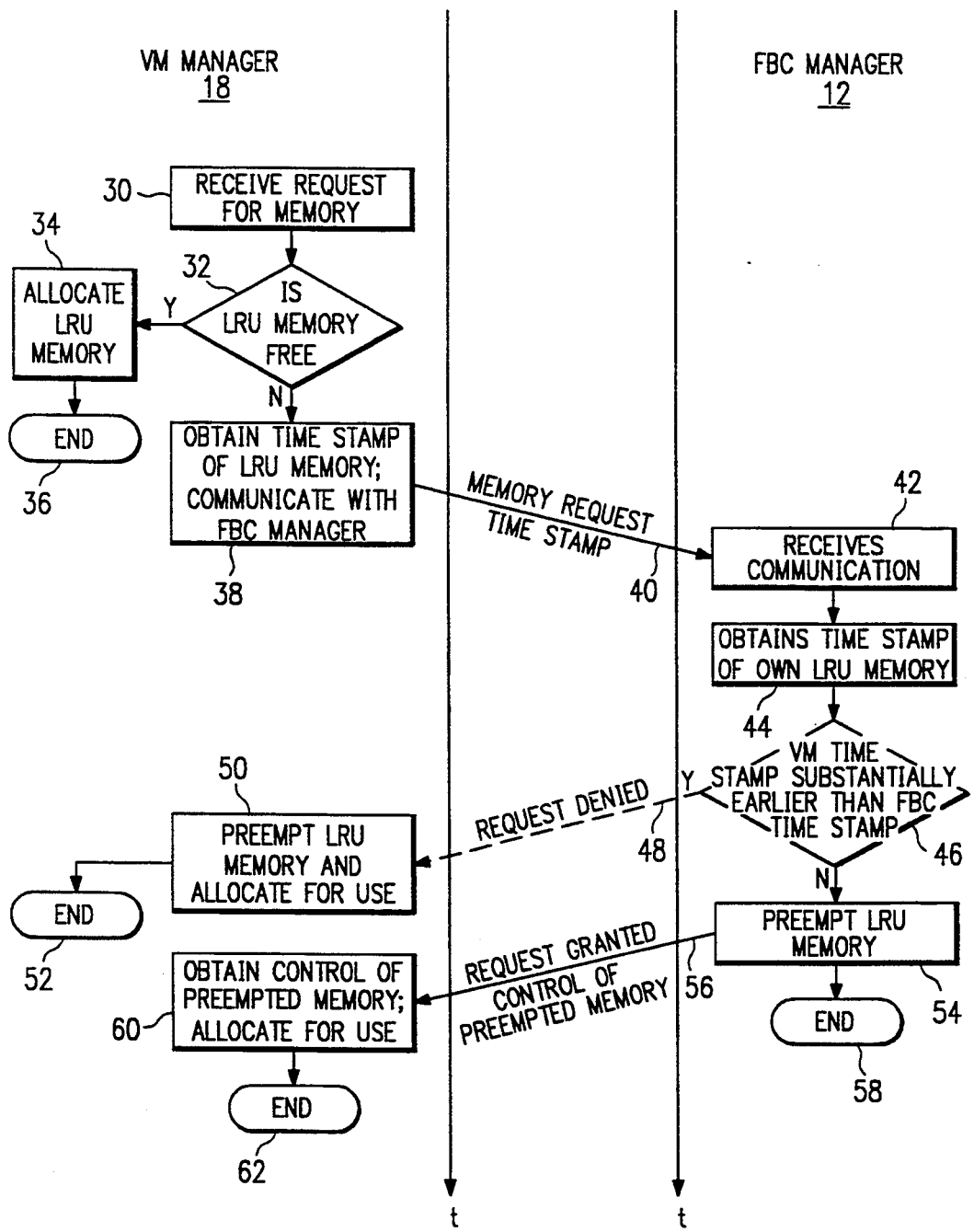
FIG. 2 is a hybrid flowchart illustrating the logic of the preferred embodiment of the present invention.

Referring to FIG. 2 for an exemplary communication session between VM manager 18 and FBC manager 12. As shown in block 30, VM manager 18 receives a request for memory from user processes and the like (not shown). VM manager 18, upon receiving the request, examines the memory under its control to determine whether it holds any free memory 22, as shown in block 32. If it has free memory in its possession, it allocates it to the requesting user process, as shown in block 34, and execution terminates in block 36. If VM manager 18 does not own any free memory, it obtains a time stamp of its least recently used (LRU) memory (block 38) and communicates this information along with a memory request to FBC manager 12, as shown in path 40.

In block 42, FBC manager 12 receives the communication from VM manager 18. FBC manager 12 obtains a time stamp of its own LRU memory, as shown in block 44. It then compares the time stamp provided by VM manager 18 and its own LRU time stamp, as shown in block 46. If the time stamp of VM manager's 18 LRU memory is substantially earlier or older than FBC manager's 12 LRU memory time stamp, then VM manager's 18 request is denied. This is communicated to VM manager 18 via path 48. Otherwise, in block 54 FBC manager 12 preempts its own LRU memory so that it may be passed to VM manager 18. VM manager 18's request is granted and control of the preempted memory is passed to VM manager 18, as shown in path 56. FBC manager's execution subsequently terminates in block 58. In block 60, VM manager 18, upon receipt of FBC manager's 12 communication, obtains control of the preempted memory, and allocates it for use. Execution terminates in block 62.

Note that the comparison of the time stamps must be such that the difference therebetween must be great enough to justify the passing of memory to VM manager 18 rather than preempting its own memory. Additionally, the identities of VM manager 18 and FBC manager 12 may be switched in FIG. 2. In other words, FBC manager 12 may issue a request for memory to VM manager 18, causing VM manager 18 to preempt a piece of memory under its control because it carries an older time stamp than FBC manager's 12 LRU memory.

In the simplest scenario, both VM manager 18 and FBC manager 12 manipulate memory under their control in the same unit. However, a more complex scenario arises when VM manager 18 operates with memory chunks of size X and FBC manager 12 operates with memory chunks of size Y, where X does not equal Y. In such systems, the passing of memory ownership between managers 12 and 18 must be so coordinated that no fraction of memory sizes occur. For example, if the cache buffer size is in 1K-byte blocks and the virtual memory are in 4K-byte pages, the memory passed between them should be 4K bytes. There are a number of ways to accomplish this.

One method may be used where FBC manager 12 identifies the most inactive or LRU buffer, and forcibly preempts the other three buffers in the same page when the time stamp of the LRU buffer is substantially older than VM manager's 18 LRU memory. However, this method may cause premature preemption of still active buffers.

Another method involves requiring FBC manager 12 to identify the four most inactive buffers, say one in page W, two in page Z, and another in page Q. The data in the active buffers of each page are then shuffled to other pages in order to preempt a page of memory. For example, since page Z contains two LRU buffers, only two buffers of data are needed to be copied to pages W and Q to yield one preempted page Z. It may be seen that although this method evaluates each buffer on a LRU basis and thus would not preempt a buffer prematurely, this method is complex and may require more data manipulation than is saved by passing memory ownership.

The preferred method of resolving the memory size inconsistency problem is to assign a time stamp only to groups of memory, the size of which equals the size of memory to be passed between VM manager 18 and FBC manager 12. For example, a time stamp is assigned to four cache buffers which consist of one page of memory. Implemented in this manner, the time stamp for a page of cache buffer memory represents the status of the most recently used buffer. All other buffers within the same page are less active than the most recently used buffer.

Figure 3:
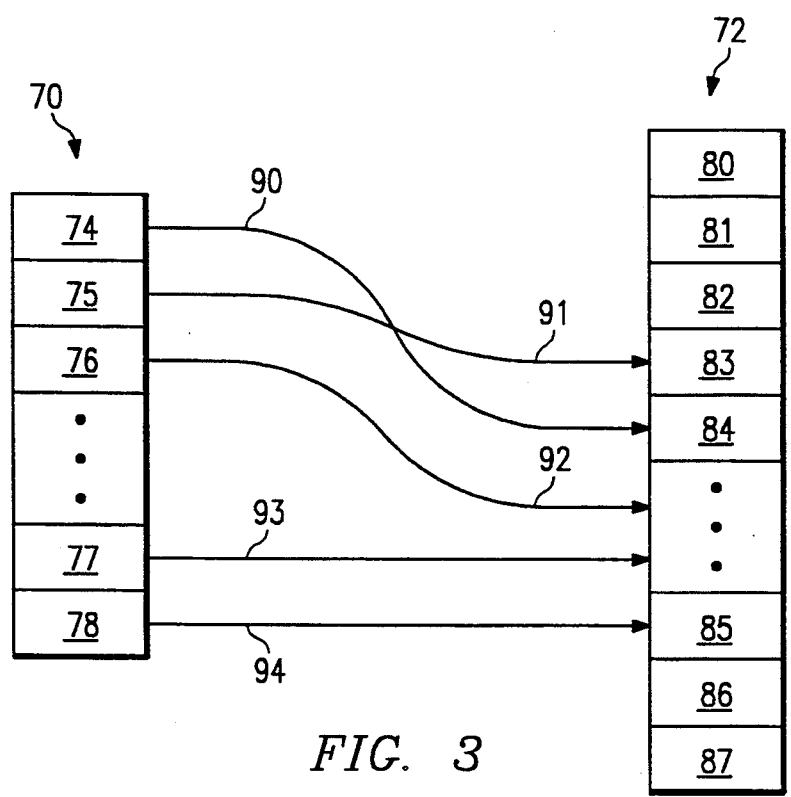
FIG. 3 is a diagram showing the preferred data structure of the present invention.

Referring to FIG. 3 for a diagram of a preferred embodiment of data structures used to implement and resolve the memory size inconsistency problem as described above. The data structure preferably consist of two stacks: one page-oriented stack 70 and one buffer-oriented stack 72. Page-oriented stack 70 maintains an ordering of the pages 74–78 under the control of FBC manager 12, where page 74 at the top of stack 70 is the most active page, and page 78 at the bottom of stack 70 is the least active page. Similarly, buffer-oriented stack 72 maintains an ordering of buffers 80–87, where buffer 80 at the top of stack 72 is the most active buffer and buffer 87 at the bottom of stack 72 is the least active buffer. If the size of a page under VM manager 18 control is equal to the size of four buffers combined, then each page 74–78 in stack 70 in effect is composed of four buffers occupying contiguous memory in stack 72. Therefore, each page 74–78 possesses a pointer 90–94 pointing to the first buffer in the contiguous block of memory which comprises the page.

As a buffer is accessed, its timestamp is set to the current time or the time of access, and moved to the top of stack 72. Concurrently, the corresponding page is also assigned the same timestamp and also moved to the top of stack 70. In this manner, if a comparison of time stamps results in a preemption of a group of four buffers, no data is prematurely erased because the pages are ordered and preempted according to the most active or most recently used buffer timestamp in the group.

In the multiprocessor environment, each processor possess main memory and a VM manager and a FBC manager. The ownership of memory may shift between the FBC manager and VM manager in each processor, but no sharing of memory is permitted between processors. The data structure described above is preferably replicated for each processor to implement dynamic memory allocation. However, processors may have access to buffer cache and virtual address space of other processors. This may be accomplished by including a processor identification code, for example, in each buffer 80-87 and page 74-78 to identify the processor and the correct data structure each belongs.

Although the present invention has been described in detail, it should be understood that various changes, substitutions and alterations can be made thereto without departing from the spirit and scope of the present invention as defined by the appended claims.

What is claimed is:

1. A system for managing memory allocation between a first and a second memory manager, comprising:
   means for ordering memories allocated to said first memory manager on a least recently used basis;
   means for ordering memories allocated to said second memory manager on a least recently used basis;
   means for comparing access time indications of least recently used memories of said first and second memory managers in response to a request for memory by said first memory manager;
   means for preempting one of said least recently used memories allocated to said first and second memory managers in response to it being less recently used than said other; and
   means for allocating said preempted memory to said first memory manager.

2. The system, as set forth in claim 1, further comprising: means for comparing time indications of least recently used memories of said first and second memory managers in response to a request for memory by said second memory manager;
   means for preempting one of said least recently used memories allocated to said first and second memory managers in response to it being less recently used than said other; and
   means for allocating said preempted memory to said second memory manager.

3. The system, as set forth in claim 1, wherein said first memory manager memory ordering means further comprises means for time stamping said allocated memory at time of last access.

4. The system, as set forth in claim 3, wherein said second memory manager memory ordering means further comprises means for time stamping said allocated memory at time of last access.

5. The system, as set forth in claim 4, wherein said comparing means compares said time stamps of said least recently used memories, and said preempting means preempts said least recently used memory having the older time stamp.

6. The system, as set forth in claim 1, further comprising means for marking memories allocated to said first memory manager as free.

7. The system, as set forth in claim 6, further comprising:
   means for searching for a memory marked as free in response to said memory request from said second memory manager; and
   means for allocating said found free memory to said second memory manager.

8. The system, as set forth in claim 1, further comprising means for marking memories allocated to said second memory manager as free.

9. The system, as set forth in claim 8, further comprising:
   means for searching for a memory marked as free in response to said memory request from said first memory manager; and
   means for allocating said found free memory to said first memory manager.

10. The system, as set forth in claim 1, wherein said first memory manager is a file buffer cache manager.

11. The system, as set forth in claim 1, wherein said second memory manager is a virtual memory manager.

12. A system for managing memory allocation for a first and a second memory users, comprising:
    means for time stamping memories allocated to said first memory user wherein a time stamp is a time when a memory is last accessed:
    means for time ordering said memories allocated to said first memory user based on their least recently used time stamps;
    means for marking memories allocated to said first memory user which are not in use:
    means for receiving a request for memory from said second memory user;
    means for locating a memory, normally allocated to first memory user, not in use and allocating said located memory to said second memory user in response to said request; said memory request receiving means further receives a time stamp of a least recently used memory from said second memory user;
    means for locating a memory allocated to said first memory user having an oldest time stamp;
    means for comparing said oldest time stamp with said received time stamp from said second memory user; and
    means for allocating said memory with the oldest time stamp to said second memory user in response to said oldest time stamp being older than said received time stamp from said second memory user.

13. The system, as set forth in claim 12, further comprising means for denying said memory request in response to not locating a memory not in use.

14. The system, as set forth in claim 12, further comprising means for denying said memory request in response to said received time stamp being substantially older than said oldest time stamp.

15. The system, as set forth in claim 12, further comprising:
    means for time stamping memories allocated to said second memory user wherein a time stamp is a time when a memory is last accessed:
    means for time ordering said memories allocated to said second memory user based on their least recently used time stamps;
    means for marking memories allocated to said second memory user which are not in use:
    means for receiving a request for memory from said first memory user;
    means for locating a memory, normally allocated to second memory user, not in use and allocating said located memory to said first memory user in response to said request.

16. The system, as set forth in claim 15, wherein said memory request receiving means further receives a time stamp of its least recently used memory from said first memory user.

17. The system, as set forth in claim 16, further comprising:
   means for locating a memory allocated to said second memory user having the oldest time stamp;
   means for comparing said oldest time stamp with said received time stamp from said first memory user; and
   means for allocating said memory with the oldest time stamp to said first memory user in response to said oldest time stamp being older than said received time stamp from said first memory user.

18. The system, as set forth in claim 17, further comprising means for denying said memory request from said first memory user in response to said received time stamp being older than said oldest time stamp.

19. The system, as set forth in claim 15, further comprising means for denying said memory request from said first memory user in response to not locating a memory not in use.

20. The system, as set forth in claim 12, wherein said first memory user is a virtual memory manager.

21. The system, as set forth in claim 12, wherein said second memory user is a file buffer cache.

22. A system for managing memory allocation for a virtual memory manager and a file buffer cache manager, comprising:
   means for time stamping memories allocated to said virtual memory manager wherein a time stamp is a time when a memory is last accessed;
   means for time ordering said memories allocated to said virtual memory manager based on their least recently used time stamps;
   means for marking memories allocated to said virtual memory manger which are not in use;
   means for receiving a request for memory from said file buffer cache manager;
   means for locating a memory, normally allocated to said virtual memory manager, not in use and allocating said located memory to said file buffer cache manager in response to said request; said memory request receiving means further receives a time stamp of a least recently used memory from said file buffer cache manager;
   means for locating a memory allocated to said virtual memory manager having an oldest time stamp;
   means for comparing said oldest time stamp with said received time stamp from said file buffer cache; and
   means for allocating said memory with the oldest time stamp to said file buffer cache manager in response to said oldest time stamp being older than said received time stamp from said file buffer cache manager.

23. The system, as set forth in claim 22, further comprising means for denying said memory request from said file buffer cache manager in response to not locating a memory not in use.

24. The system, as set forth in claim 22, further comprising means for denying said memory request in response to said received time stamp being older than said oldest time stamp.

25. The system as set forth in claim 22, further comprising:
   means for time stamping memories allocated to said file buffer cache manager wherein a time stamp is a time when a memory is last accessed;
   means for time ordering said memories allocated to said file buffer cache manager based on their least recently used time stamps;
   means for marking memories allocated to said file buffer cache manger which are not in use;
   means for receiving a request for memory from said virtual memory manager; and
   means for locating a memory, normally it located to said file buffer cache manager, not in use and allocating said located memory to said virtual memory manager in response to said request.

26. The system, as set forth in claim 25, further comprising means for denying said memory request from said virtual memory manager in response to not locating a memory not in use.

27. The system, as set forth in claim 25, wherein said memory request receiving means further receives a time stamp of a least recently used memory from said virtual memory manager.

28. The system, as set·forth in claim 27, further comprising:
   means for locating a memory allocated to said file buffer cache manager having an oldest time stamp;
   means for comparing said oldest time stamp with said received time stamp from said virtual memory manager; and
   means for allocating said memory with the oldest time stamp to said virtual memory manager in response to said oldest time stamp being older than said received time stamp from said virtual memory manager.

29. The system, as set forth in claim 28, further comprising means for denying said memory request from said virtual memory manager in response to said received time stamp being older than said oldest time stamp.

30. The system, as set forth in claim 22, wherein said virtual memory manager manages said virtual address space in blocks of a first predetermined size, and said file buffer cache manager manages said file buffer cache in blocks of a second predetermined size.

31. The system, as set forth in claim 30, wherein said first predetermined size is equal to an X number multiple of said second predetermined size.

32. The system, as set forth in claim 31, further comprising:
   means for grouping every X number of said second predetermined sized blocks;
   means for time stamping each group of said blocks whenever one of its X blocks is accessed;
   said locating means locating a group of said second predetermined sized blocks having the oldest time stamp;
   said comparing means comparing said oldest group time stamp with said received time stamp; and
   said allocating means preempting said group of said second predetermined sized blocks with the oldest time stamp and allocating said preempted group to said virtual memory manager in response to said oldest time stamp being older than said received time stamp.

33. A system for dynamically allocating a predetermined amount of memory between a first and a second competing resources, comprising:
   first means for allocating memories to said first resource;

means for time stamping said memories allocated to said first resource; wherein a time stamp is a time when a memory is last accessed second means for allocating memories to said second resource;

means for time stamping said memories allocated to said second resource; wherein a time stamp is a time when a memory is last accessed means for requesting for additional memory for said first and second resources:

means for comparing time stamps of said memories allocated to said first and second resources;

means for preempting said memory allocated to said first resource in response to said time stamp of said first resource memory being earlier than said second resource memory: and means for preempting said memory allocated to said second resource in response to said time stamp of said second resource memory being earlier than said first resource memory.

34. A system for dynamically allocating memory to a file buffer cache and a virtual memory space, comprising:

management means for acquiring memory for said file buffer cache;

means for time stamping said acquired file buffer cache memory at times of acquisition and access;

management means for acquiring memory for said virtual memory space;

means for time stamping each said acquired virtual memory space memory at times of acquisition and access;

means for comparing the time stamps of said memories acquired by said file buffer cache management means and said virtual memory space management means;

means for preempting memory acquired by said file buffer cache management means in response to said time stamp of said memory acquired by said file buffer cache management means being earlier than said time stamp of said memory acquired by said virtual memory space management means; and means for preempting memory acquired by said virtual memory management means in response to said time stamp of said memory acquired by said virtual memory space management means being earlier than said time stamp of said memory acquired by said file buffer cache management means.

35. A system for dynamically allocating memory to a file buffer cache and a virtual memory space, comprising:

means for initial allocation of memory to said file buffer cache;

management means for acquiring a first predetermined amount of memory for said file buffer cache;

management means for acquiring a second predetermined amount of memory for said virtual memory space;

means for time stamping each said acquired first predetermined amount of memory at the time of its acquisition and access by said file buffer cache management means;

means for time stamping each said acquired second predetermined amount of memory at the time of its acquisition and access by said virtual memory space management means;

means for comparing the time stamp of said memory acquired by said file buffer cache management means and said virtual memory space management means;

means for preempting a first predetermined amount of memory acquired by said file buffer cache management means in response to said time stamp of said memory acquired by said file buffer cache management means being earlier than said time stamp of said memory acquired by said virtual memory space management means; and means for preempting a second predetermined amount of memory acquired by said virtual memory management means in response to said time stamp of said memory acquired by said virtual memory space management means being earlier than said time stamp of said memory acquired by said file buffer cache management means.

36. A method for managing memory allocation between a first and a second memory managers, comprising the steps of:

ordering memory allocated to said first memory manager on a least recently used basis;

ordering memory allocated to said second memory manager on a least recently used basis;

comparing time indication of least recently used memories of said first and second memory managers in response to a request for memory by said first memory manager;

preempting one of said least recently used memories allocated to said first and second memory managers in response to it being less recently used than said other; and allocating said preempted memory to said first memory manager.

37. The method, as set forth in claim 36, further comprising the steps of:

comparing time indication of least recently used memories of said first and second memory managers in response to a request for memory by said second memory manager;

preempting one of said least recently used memories allocated to said first and second memory managers in response to it being less recently used than said other; and allocating said preempted memory to said second memory manager.

38. The method, as set forth in claim 36, wherein said first memory manager memory ordering means further comprises the step of time stamping said allocated memory at time of last access.

39. The method, as set forth in claim 38, wherein said second memory manager memory ordering step further comprises the step of time stamping said allocated memory at time of last access.

40. The method, as set forth in claim 39, wherein said comparing step further compares said time stamps of said least recently used memories, and said preempting step further preempts said least recently used memory having the older time stamp.

41. The method, as set forth in claim 36, further comprising the step of marking memories allocated to said first memory manager as free.

42. The method, as set forth in claim 41, further comprising the steps of:

searching for a memory marked as free in response to said memory request from said second memory manager; and allocating said found free memory to said second memory manager:

43. The method, as set forth in claim 36, further comprising the step of marking memories allocated to said second memory manager as free.

44. The method, as set forth in claim 47, further comprising the steps of:
   searching for a memory marked as free in response to said memory request from said first memory manager; and
   allocating said found free memory to said first memory manager.

45. A method for managing memory allocation for a first and a second memory users, comprising the step of:
   time stamping memories allocated to said first memory user wherein a time stamp is a time when a memory is last accessed:
   time ordering said memories allocated to said first memory user based on their least recently used time stamps;
   making memories allocated to said first memory user which are not in use;
   receiving a request for memory from said second memory user;
   locating a memory, normally allocated to first memory user, not in use and allocating said located memory to said second memory user in response to said request;
   said memory request receiving means further receives a time stamp of a least recently used memory from said second memory user;
   locating a memory allocated to said first memory user having an oldest time stamp;
   comparing said oldest time stamp with said received time stamp from said second memory user; and
   allocating said memory with the oldest time stamp to said second memory user in response to said oldest time stamp being older than said received time stamp from said second memory user.

46. The method, as set forth in claim 45, further comprising the step of denying said memory request in response to not locating a memory not in use.

47. The method, as set forth in claim 45, further comprising the step of denying said memory request in response to said received time stamp being older than said oldest time stamp.

48. The method, as set forth in claim 45, further comprising:
   the steps of:
   time stamping memories allocated to said second memory user wherein a time stamp is a time when a memory is last accessed:
   time ordering said memories allocated to said second memory user based on their least recently used time stamps;
   marking memories allocated to said second memory user which are not in use;
   receiving a request for memory from said first memory user;
   locating a memory, normally allocated to second memory user, not in use and allocating said located memory to said first memory user in response to said request, 49. The method, as set forth in claim 48, further comprising the step of denying said memory request from said first memory user in response to not locating a memory not in use.

50. The method, as set forth in claim 49, wherein said memory request receiving step further comprises the step of receiving a time stamp of a least recently used memory from said first memory user.

51. The method, as set forth in claim 50, further comprising the steps of:
   locating a memory allocated to said second memory user having the oldest time stamp;
   comparing said oldest time stamp with said received time stamp from said first memory use; and
   allocating said memory with the oldest time stamp to said first memory user in response to said oldest time stamp being older than said received time stamp from said first memory user.

52. The method, as set forth in claim 51, further comprising the step of denying said memory request from said first memory user in response to said received time stamp being older than said oldest time stamp.

53. A method for managing memory allocation for a virtual memory manager and a file buffer cache manager, comprising the steps of:
   means for time stamping memories allocated to said virtual memory manager wherein a time stamp is a time when a memory is last accessed:
   time ordering said memories allocated to said virtual memory manager based on their least recently used time stamps;
   for marking memories allocated to said virtual memory manger which are not in use;
   receiving a request for memory from said file buffer cache manager;
   locating a memory, partially allocated to said virtual memory manager, not in use and allocating said located memory to said file buffer cache manager in response to said request; said memory request receiving means further receives a time stamp of a least recently used memory from said file buffer cache manager;
   locating a memory allocated to said virtual memory manager having an oldest time stamp;
   comparing said oldest time stamp with said received time stamp from said file buffer cache; and
   allocating said memory with the oldest time stamp to said file buffer cache manager in response to said oldest time stamp being older than said received time stamp from said file buffer cache manager.

54. The method, as set forth in claim 53, further comprising the step of denying said memory request from said file buffer cache manager in response to not locating a memory not in use.

55. The method, as set forth in claim 53, further comprising the step of denying said memory request in response to said received time stamp being older than said oldest time stamp.

56. The method, as set forth in claim 53, further comprising the steps of:
   time stamping memories allocated to said file buffer cache manager wherein a time stamp is a time when a memory is last accessed;
   time ordering said memories allocated to said file buffer cache manager based on their least recently used time stamps;
   marking memories allocated to said file buffer cache manger which are not in use;
   receiving a request for memory from said virtual memory manager; and
   locating a memory, normally allocated to said file buffer cache manager, not in use and allocating said located memory to said virtual memory manager in response to said request.

57. The method, as set forth in claim 56, further comprising the step of denying said memory request from said virtual memory manager in response to not locating a memory not in use.

58. The method, as set forth in claim 57, wherein said memory request receiving step further comprises the step of receiving a time stamp of a least recently used from said virtual memory manager.

59. The method, as set forth in claim 58, further comprising the steps of:
locating a memory allocated to said file buffer cache manager having an oldest time stamp;
comparing said oldest time stamp with said received time stamp from said virtual memory manager; and
allocating said memory with the oldest time stamp to said virtual memory manager in response to said oldest time stamp being older than said received time stamp from said virtual memory manager.

60. The method, as set forth in claim 59, further comprising the step of denying said memory request from said virtual memory manager in response to said received time stamp being older than said oldest time stamp.

61. The method, as set forth in claim 53, wherein said virtual memory manager manages said virtual address space in blocks of a first predetermined size, and said file buffer cache manager manages said file buffer cache in blocks of a second predetermined size.

62. The method, as set forth in claim 61, wherein said virtual memory manager manages said virtual address space in said first predetermined size equaling to an X number multiple of said second predetermined size.

63. The method, as set forth in claim 62, further comprising the steps of:
grouping every X number of said second predetermined sized blocks;
time stamping each group of said blocks whenever one of its X blocks is accessed;
said locating step further locating a group of said second predetermined sized blocks having the oldest time stamp;
said comparing step further comparing said oldest group time stamp with said received time stamp; and
said allocating step further preempting said group of said second predetermined sized blocks with the oldest time stamp and allocating said preempted group to said virtual memory manager in response to said oldest time stamp being substantially older than said received time stamp.

64. A method for dynamically allocating a predetermined amount of memory between a first and a second competing resources, comprising:
allocating memories to said first resource;
stamping said memories allocated to said first resource; wherein a time stamp is a time when a memory is last accessed
allocating memories to said second resource;
time stamping said memories allocated to said second resource; wherein a time stamp is a time when a memory is last accessed
requesting for additional memory for said first and second resources;
comparing time stamps of said memories allocated to said first and second resources;
preempting said memory allocated to said first resource in response to said time stamp of said first resource memory being earlier than said second resource memory; and
preempting said memory allocated to said second resource in response to said time stamp of said second resource memory being earlier than said first resource memory.

65. A system for managing memory allocation between a first and a second memory control means, comprising:
means for ordering memory allocated to said first memory control means on a least recently used basis;
means for ordering memory allocated to said second memory control means on a least recently used basis;
means for comparing access time indications of least recently used memories of said first and second memory control means;
means for preempting one of said least recently used memories allocated to said first and second memory control means in response to it being less recently used than said other; and
means for allocating said preempted memory to said first memory control means.

66. The system, as set forth in claim 65, wherein said first memory control means memory ordering means further comprises means for time stamping said allocated memory at time of last access.

67. The system, as set forth in claim 66, wherein said second memory manager memory ordering means further comprises means for time stamping said allocated memory at time of last access.

68. The system, as set forth in claim 67, wherein said comparing means compares said time stamps of said least recently used memories, and said preempting means preempts said least recently used memory having the older time stamp.

69. A method for managing memory allocation between a first and a second memory control means, comprising the steps of:
ordering memory allocated to said first memory control means on a least recently used basis;
ordering memory allocated to said second memory control means on a least recently used basis;
comparing access time indications of least recently used memories of said first and second memory control means in response to a request for memory by said first memory control means;
preempting one of said least recently used memories allocated to said first and second memory control means in response to it being less recently used than said other; and
allocating said preempted memory to said first memory control means, 70. The method, as set forth in claim 69, wherein said first memory control means memory ordering means further comprises the step of time stamping said allocated memory at time of last access.

71. The method, as set forth in claim 70, wherein said second memory control means memory ordering step further comprises the step of time stamping said allocated memory at time of last access.

72. The method, as set forth in claim 71, wherein said comparing step further compares said time stamps of said least recently used memories, and said preempting step further preempts said least recently used memory having the older time stamp.

* * * * *